United States Patent [19]
Heinze et al.

[11] 3,940,561
[45] Feb. 24, 1976

[54] SIMPLEX INTERCOMMUNICATION SYSTEM AND A TWO-WAY INTERCOMMUNICATION SYSTEM HAVING AN ELECTRONIC TRUNKING SCHEME

[76] Inventors: Günter Heinze, Aug.-Hecht-Str. 19, 605 Offenbach am Main; Willi Müller, Fuchstanzstr. 48, 6 Frankfurt am Main; Hans Ulrich von Zimmerman, Mengeder Str. 18a, 4355 Woltrop; Karl-Heinz Schalomon, Gertrudenstr. 43, 4354 Datteln, all of Germany

[22] Filed: Oct. 30, 1973

[21] Appl. No.: 411,097

[30] Foreign Application Priority Data
Oct. 30, 1972 Germany............................ 2253101

[52] U.S. Cl............................................ 179/15 AL
[51] Int. Cl.$^2$......................................... H04J 3/02
[58] Field of Search.............................. 179/15 AL

[56] References Cited
UNITED STATES PATENTS

| | | | |
|---|---|---|---|
| 3,529,089 | 9/1970 | Davis............................ | 179/15 AL |
| 3,728,492 | 4/1973 | Cappetti........................ | 179/15 AL |
| 3,732,374 | 5/1973 | Roche............................ | 179/15 AL |

*Primary Examiner*—Thomas W. Brown
*Attorney, Agent, or Firm*—Christen & Sabol

[57] ABSTRACT

A simplex intercommunication system and a two-way intercommunication system comprising an electronic trunking scheme and being suitable for connection of about ten to a thousand subscriber stations. For example, an average system is designed to permit the connection of a maximum of 100 subscribers.

2 Claims, 5 Drawing Figures

SIMPLEX INTERCOMMUNICATION SYSTEM AND A TWO-WAY INTERCOMMUNICATION SYSTEM HAVING AN ELECTRONIC TRUNKING SCHEME

BACKGROUND OF THE INVENTION

1. Field of this Invention

This invention relates a simplex or two-way intercommunication system for offices, factories and the like, which, while costing substantially the same or only slightly more than conventional systems of this nature, can be constructed with a considerable reduction in cabling and still enable a large number of separate conversations to be carried on simultaneously.

2. Description of the Prior Art

In the case of all known simplex intercommunication systems or two-way intercommunication systems, the speech signals are transmitted substantially analog, for which reason, a couple of lines must be available per speaking circuit apart from the wires for the trunking scheme. This results from the fact that a considerable amount of cabling is required for systems of this nature - nevertheless only a limited number of conversations can be carried on simultaneously. Basically, the same difficulties apply to conventional telephone-crosstalk installations. A summary of the generally known intercommunication systems is to be found in the "NTZ-Kurier (Courier), supplement to NTZ (1970) 9, NTZ (1971) 2, NTZ (1971)".

BROAD DESCRIPTION OF THIS INVENTION

An object of this invention is to provide a simplex or two-way intercommunication system for offices, factories and the like, which, while costing substantially the same or only slightly more than conventional systems of this nature, can be constructed with a considerable reduction in cabling and still enable a large number of separate conversations to be carried on simultaneously.

It has been found that this task can be fulfilled by means of an intercommunication system which is characterized in that both the transmission of signals and the trunking scheme are covered by the time-division multiple method, in that all subscriber stations are connected to a wiring system for directed information transmission, a central synchronizing generator being provided in the wiring system to supply synchronizing signals for the time multiplex operation, and in that signal transmission in the wiring system is affected in digital form, the conversion of the (analog) speech signals taking place in the subscriber station. According to a preferred embodiment of this invention, the simplex or two-way intercommunication system is designed in such a way that each subscriber station is only adapted to respond via a time channel which is rigidly connected thereto. The establishment of connections is considerably facilitated by the provision of a fixed (rigid) channel for each subscriber station. As compared to known telephone exchange systems comprising time-multiplex operation, this scheme eliminates devices for selecting a free connection path, engagement of the path, etc. In addition, with the simplest switching means, the simultaneous calling of a plurality of subscribers or even all the subscribers is made possible (group call or collective call); conversations can be carried on via all the channels simultaneously and independent of the other channels. The speech paths or channels made available per subscriber by the one-way or two-way intercommunication system according to the invention do not involve a noticeable increase in cost over systems having a smaller number of channels. If this system were constructed on the principle of known telephone exchanges with bundling of the speech paths, it would be considerably more expensive and additional disadvantages (limited number of conversations, no possibility of group calls or collective calls) would have to be taken into account. Each station can also be provided with a fixed transmission channel or the individual subscriber stations can be provided with free conversation path which are selected according to different operating patterns directly before conversation construction. Numerous variants are possible as the system according to this invention provides for the use of electronic switching means such as accumulators, shift registers, and the like.

According to this system, the wiring system may be in the form of a (closed) ring system or in the form of an open "double spiral," consisting of two loops disposed in parallel, namely a transmission loop and a receiving loop, the end of the transmission loop being electrically connected to the beginning of the receiving loop.

The conversion of the analog speech signals into digital form takes place within the framework of this invention preferably according to the delta modulation process. Although it is generally more expensive, it is obviously also possible to use the pulse-code-modulation process for converting signals.

Another preferred embodiment of this invention consists in that in each subscriber station a local synchronizing generator is provided which consists essentially of a phase arrested loop (known as a "phase locked loop," abbreviated to: PLL) of a meter, the counting capacity of which depends on the maximum number of subscribers and the necessary synchronizing impulses, and of at least two digital comparators. The local synchronizing generator is synchronized by the central synchronizing generator and the particular time channel to which the subscriber station is connected in a fixed manner and also the time channels of the subscriber stations called (which may be selected freely by means of a keyboard) may be determined by means of the meter and the comparator. In this case, the local synchronizing generator also serves to produce the answering impulses for the modulation and demodulation stages in the individual subscriber stations.

According to this invention it is also possible to provide an additional holding memory in the subscriber station of the calling device. On determining the engaged tone of the subscriber station or stations called (in the case of a group or a collective call), this holding memory stores the time channel number or the subscriber number which has been called and repeats the call after the conversation is over.

The arrangement of the holding memory in the calling subscriber station has the advantage that this type of storage device does not have to be installed in all subscriber station but only in privileged stations.

The simplex or two-way intercommunication system according to this invention also possesses the decisive advantage in that in contradistinction to the wire bundles of conventional systems, it only requires a single ring system or a so-called "double spiral," to which all subscribers can then be connected. If a fixed channel is connected to each subscriber station, it is possible to change the position or connection of the subscriber station to any desired spot along the line, without having to change the sequence of numbers to which the particular device responds.

Another important advantage of this invention over all known systems consists in that conversations can be carried on simultaneously between all subscriber systems.

The completely electronic construction of the entire system and the use of the time-division multiplex system means that numerous special devices can be provided at no extra cost or with a minimum of expense. For example, the above-described holding device can be provided in a very simple manner — this consisting essentially of a relatively simple structural element, namely, a commercially available accumulator, which can also be installed at a later date if a little forethought is used.

DETAILED DESCRIPTION OF THIS INVENTION

Other objects, features and advantages of this invention will be made apparent from the following detailed description of the preferred embodiments thereof when reference is had to the accompanying drawings.

The drawings are in the form of block diagrams, wherein.

Figure 1:
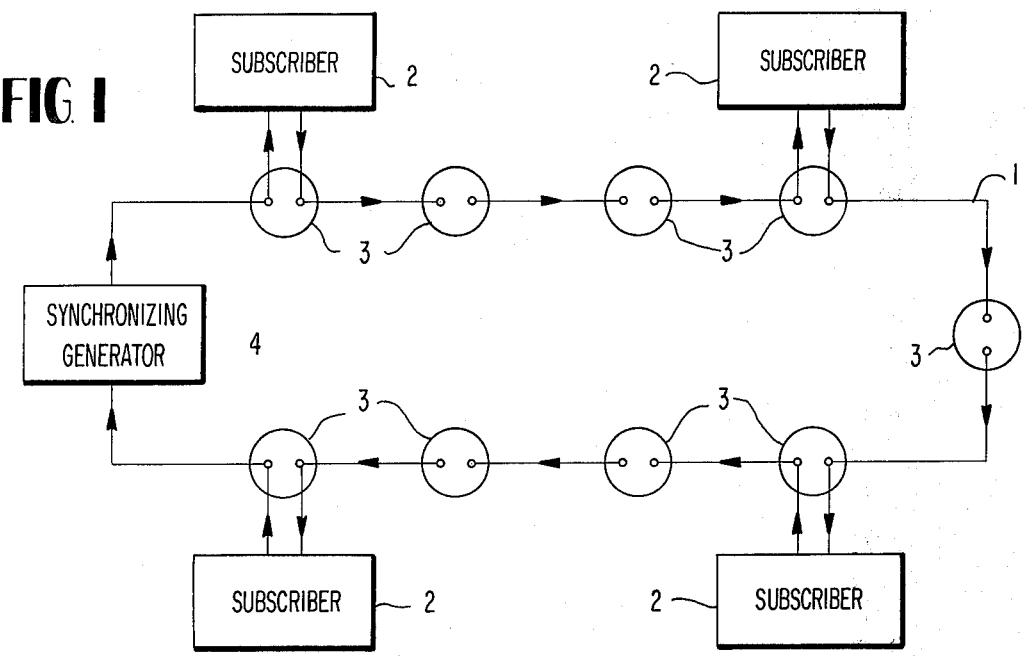
FIG. 1 shows an embodiment of the simplex or two-way intercommunication system according to this invention.

According to the embodiment shown in FIG. 1, the simplex or two-way intercommunication system according to this invention consists of ring line 1, a coaxial cable or a normal telephone double line, to which individual subscribers 2 are connected by means of connector receptacle 3. The direction of signal transmission is shown in the drawings by means of arrows. Ring line 1 is supplied with synchronizing signals by central synchronizing generator 4.

In the system shown by way of example in the drawing and which comprises a maximum of a hundred subscriber stations, synchronizing generator 4 supplies synchronizing impulse sequences for the subscriber stations of 30 impulses and then allows 100 impulse spaces for the transmission of 100 time channels. The sum, in this case, 130 impulse places, forms a frame, duration of which in the case of the present embodiment of this invention amounts to 25 $\mu$s. After a transit period occasioned by the limited propagation speed of the signals on ring line 1 the synchronizing impulses, and if they are present, also the information impulses, reach central synchronizing generator 4. In this generator, the information impulses are stored until the next frame transmitted by the same and are then blended in at the appropriate place in this frame.

Connector receptacles 3 comprise a mechanical or electrical bridge so that the signal is allowed to pass unhindered in the case of a subscriber station 2 which is not connected.

Figure 2:
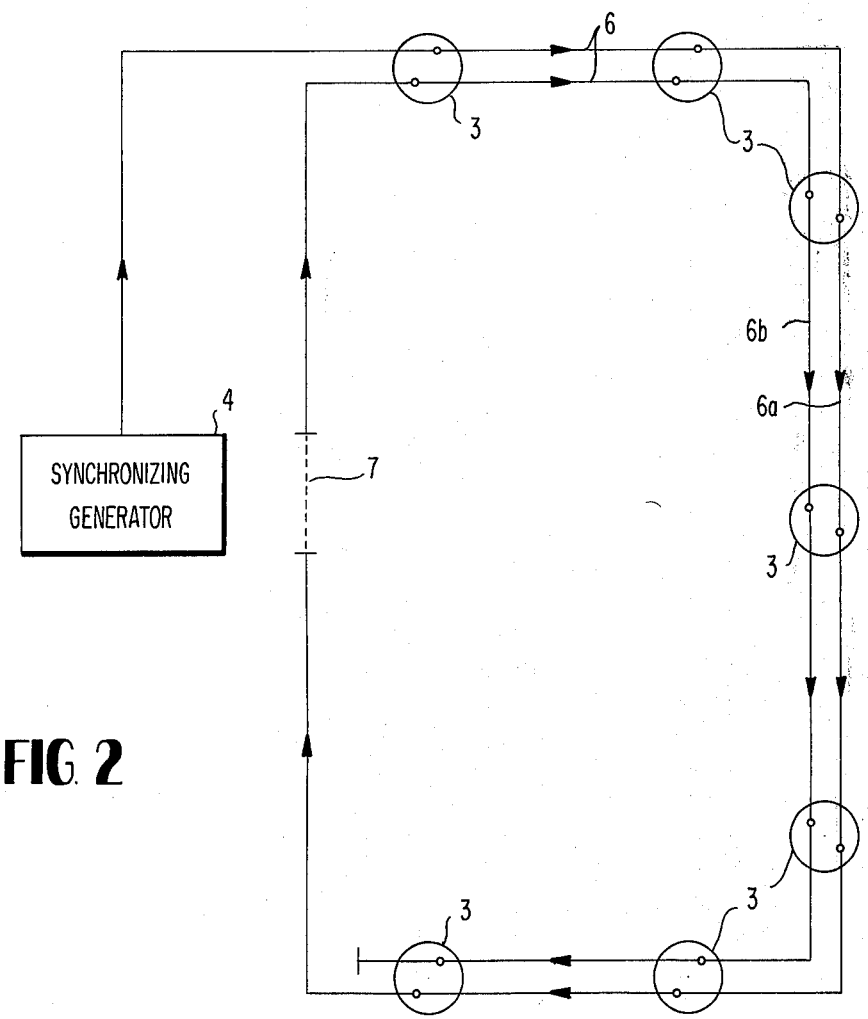
FIG. 2 shows the system according to FIG. 1 provided with a "double spiral"

So-called "double spiral" 6 may be used in place of ring line 1 according to FIG. 2. This "double spiral" consists of two loops laid in parallel, namely transmitting and receiving loop 6a and 6b, respectively. The end of the transmitting loop (at point 7) is electrically connected to the beginning of the receiving loop. This eliminates the use of an accumulator arranged in central synchronizing generator 4 when ring line 1 is used and which, as described, initially stores the information impulses and then blends them into the frames at the correct point.

Figure 3:
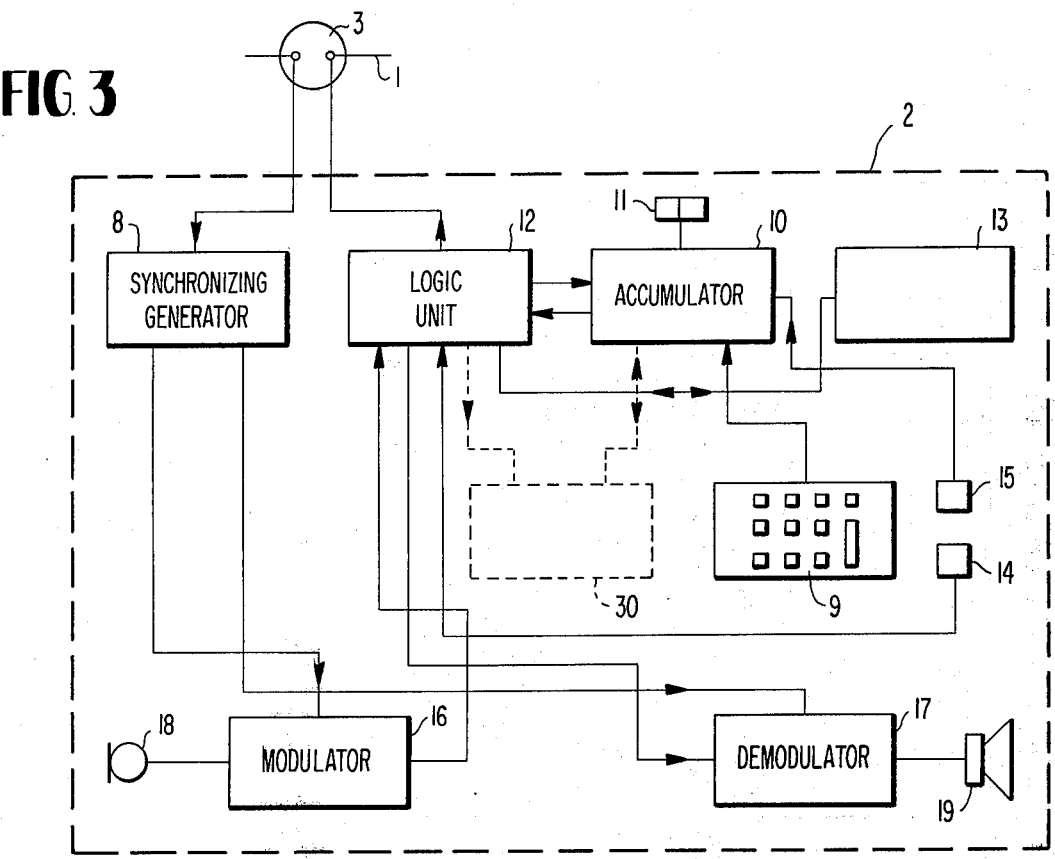
FIG. 3 shows a subscriber station of the system according to FIG. 1, in this case the subscriber station of a simplex intercommunication system.

FIG. 3 shows the construction principle of subscriber station 2 for simplex operation. Each subscriber station 2 possesses its own local synchronizing generator 8 which is synchronized by the synchronizing impulse sequences transmitted on ring line 1 or double spiral 6 from central synchronizing generator 4 in such a way that not only phase synchronism but absolute phase uniformity is obtained.

This absolute phase uniformity may be obtained, for example, by means of a phase locked loop consisting in a known manner of a voltage controlled oscillator, a phase comparator (or phase discriminator), an amplifier (loop amplifier) and a low-pass filter (loop filter). Through the voltage control oscillator and the signal at which the oscillator is to be synchronized, the phase comparator is controlled. The output signal of this phase comparator is conveyed to the voltage control oscillator as a control signal via the low-passs filter after passing the loop amplifier.

In the case of the phase locked loop provided in the described embodiment of this invention, to obtain the desired absolute phase uniformity, a digital phase comparator is used which immediately issues (maximum) control signal upon only a very slight deviation from the phase identity.

Apart from the phase locked loop each local synchronizing generator 8 contains a meter, the capacity of which, in a system with a maximum of 100 subscribers, taking into consideration the places for the synchronizing impulses, should be about 130. Each local synchronizing generator 8 also contains at least two digital comparators, by means of which the time channel fixedly connected to each subscriber station and the freely selectable time channel of the station called can be determined. In this case, each subscriber station 2 is only adapted to respond via the time channel associated therewith. For this reason, to answer a call, the subscriber station must be informed of the identity of the calling subscriber. As the caller is probably only able to respond via a specific time channel, the station which has been called must now send its answer in the time channel of the subscriber making the call.

According to the present embodiment of this invention, the analog speech signal coming from microphone 18 is converted into digital signal form in modulator stages 16 according to the delta modulation process. In this modulation process, the analog speech signal is constantly checked by interrogation impulses to ascertain whether the amplitude of the speech signal has become smaller or larger since the preceding interrogation impulse. An increase in amplitude produces an L impulse, while, when the amplitude has decreased, no impulse (O) is issued. If no speech signal is present, L and O are produced constantly in an alternating manner. When the amplitude of the speech signal increases, the number of L's follow in succession. When the amplitude of the speech signal decreases the O signals increase.

The original analog speech signal is recovered from the digital impulse sequence by integration from the arriving impulse sequence in demodulator 17 which is shown in FIG. 3 on the demodulation or receiving side of the subscriber circuit. In FIG. 3, the loudspeaker connected to the demodulator 17 is designated by 19.

In the present embodiment of this invention, the interrogation impulse sequence for the delta modulation is recovered from the synchronizing cycle for local synchronizing generator 8 and amounts, for example, to 40 kHz. Accordingly, this is a synchronized delta modulation process.

The individual subscriber stations also comprise the necessary electronic devices for producing and terminating a conversation, for indicating when a line is occupied, for recognizing the caller, etc.

The establishment of a connection when a subscriber is called is generally as follows:

If subscriber A wishes to speak to another subscriber B, he has to cut into the other time channel. To effect this, he supplies the number of subscriber B via his keyboard 9 into accumulator 10. The number which has been called appears for control in indicator field 11 (in this case a two place indicator field). Logic unit 12, which is controlled by local synchronizing generator 8, selects the desired time channel of subscriber B. Local synchronizing generator 8 is itself synchronized by central synchronizing generator 4 shown in FIG. 1. Subscriber A who is making the call then automatically checks whether the subscriber station being called is free or busy. Components 13 for recognizing the busy signal are used for this purpose.

The method of recognizing the busy signal is relatively simple. If subscriber B, who has been called is free, there are no L signals present in his time channel. This also applies to a decreasing amplitude of the speech signal but only for a short period of time which is immediately followed by a period in which L signals predominate.

Accordingly, all that needs to be checked, is whether an L has occurred in the time channel of subscriber B within a sufficiently long period of time (less than 0.1 seconds).

There are obviously numerous other ways of recognizing when a line is busy.

The station making the call also constantly issues L signals in its own channel to indicate to other stations that it is in the busy state. If the subscriber who has been called is busy, his number is eliminated from the indicator field of subscriber A. If B is free, the number of the station making the call is automatically transmitted to accumulator 10 of the station which has been called where it is indicated in indicator field 11. An acoustic call signal is simultaneously released. If subscriber B who has been called is busy, the call signal can be supplied to additional holding memory 30 indicated in FIG. 3 by the perforated line. On termination of the conversation being carried on, this additional holding memory 30 indicates the number of the waiting caller in indicator field 11. It is also possible to store information regarding a number of callers. With a suitable switching layout, subscriber A can speak to a third subscriber while he is waiting for subscriber B to become free.

In the case of a subscriber station of an intercommunication system shown in FIG. 3, to reply to the call, called subscriber B has to activate an interception blocking key and can then announce himself. Calling subscriber A controls the course of the conversation with his speech turn key 14. In the case in question, this is provided to prevent an acoustical reaction which would occur in a two-way intercommuncation system, if no preventive measures were used. Called subscriber B does not have to activate any other keys apart from the interception blocking key. Means for automatically reversing the amplitude to avoid reactions can also be employed in place of the speech turn key.

To terminate the conversation, both persons involved in the conversation activate termination key 15, thereby switching off their particular accumulator 10. The time channels of the two subscribers are then free again.

Other modifications of the system in question consist in that the time channel is kept free for collective calls or emergency calls. This time channnel releases a signal in all subscriber stations. Group call arrangements would be constructed in the similar manner.

If the system in question is not constructed as a simplex intercommunication system but as a two-way intercommunication system, additional measures are required to reliably exclude an acoustical reaction. For this purpose, directional microphones in combination with loudspeakers acoustically disengaged by the microphone may, for example, be used. An acoustical reaction may be avoided and thus two-way operation made possible by other measures, for example, by maintaining a minimum distance between the microphone and the loudspeaker.

Figure 4:
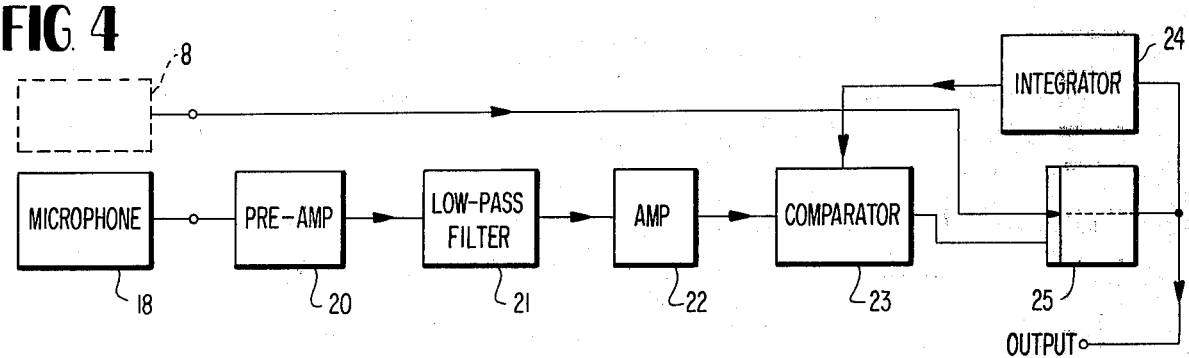
FIG. 4 shows the modulator or transmission stage of the subscriber station according to FIG. 3.

The essential construction of transmitting or modulation stage 16, which operates according to the delta modulation process may be obtained from FIG. 4.

The LF signal coming from microphone 18 (see FIG. 3) passes through pre-amplifier 20, another amplifier 22 and is supplied to comparator arrangement 23 which operates in the manner of a trigger. The comparative magnitude provides the output signal of the delta modulator evaluted at integrator 24. The stage of comparative trigger 23 is transmitted to bistable sweep stage 25 by the interrogation impulse from local synchronizing generator 8, which in this case is indicated by the perforated lines. (see FIG. 3). Bistable sweep stage 25 provides the output signal.

Figure 5:
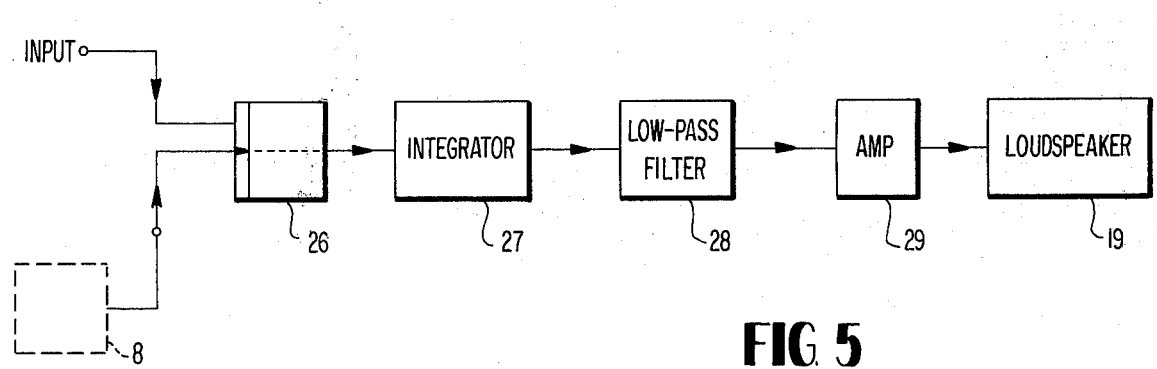
FIG. 5 shows the receiving part of the subscriber station according to FIG. 3.

The circuitry of demodulation or receiving stage 17 according to FIG. 3 is shown in detail in FIG. 5. Once during each frame local synchronizing generator 8 interrogates the time channel which is connected to the particular subscriber station and then transmits its state to bistable sweep stage 26. The output signal of this sweep stage is evaluated by integrator 27 and its frequency is then limited by low-pass filter 28. The output signal is then amplified by LF power amplifier 29 to a capacity which is capable of modulating loudspeaker 19 (see FIG. 3).

What is claimed is:

1. A simplex or two-way intercommunciation system for a large number of subscriber stations, for example, permitting the connection of about 10 to 1000 subscribers, and having an electronic trunking scheme or system of establishing the connections, characterized in that both the transmission of signals and the establishment of connections is effected by the time-division multiplex process, in that all of the subscriber stations are connected to a wiring system for directed information transmission, said wiring system comprising a central synchronizing generator which supplies synchronizing signals for the time division multiplex operation, and in that the signal transmission to the wiring system is digital, the conversion of the analog speech signal into digital signal form and the recovery of the speech signal taking place in the subscriber stations, the conversion of the speech signals into digital signal form being effected according to the delta modulation process, and each subscriber being able only to respond via a time channel fixedly connected thereto, and a local synchronizing generator is provided in each subscriber station, said local synchronizing generator consisting essentially of a phase arrested loop, a meter, the counting capacity of which depends on the maximum number of subscribers and the requisite synchronizing impulses, and at least two digital comparators, the local synchronizing generator being synchronized by the central synchronizing generator and the particular time channel which is fixedly connected to the subscriber stations and the freely selectable time channels of the subscriber stations called being adapted to be determined by the meter and the comparator, and wherein the local synchronizing generator is designed to be used simultaneously for producing the interrogation impulses for the modulation and demodulation stages.

2. A simplex or two-way intercommunication system according to claim 1 wherein an additional holding memory is provided in the subscriber station of the caller, said holding memory storing the number of the time channel or the subscriber calling when its own particular station is busy and repeating the call when the station called is again free.

* * * * *